US008652238B2

(12) United States Patent
James

(10) Patent No.: US 8,652,238 B2
(45) Date of Patent: Feb. 18, 2014

(54) AIR DIRECTING DEVICE FOR MOTORCYCLES

(76) Inventor: John Campbell James, Playa del Rey, CA (US)

( * ) Notice: Subject to any disclaimer, the term of this patent is extended or adjusted under 35 U.S.C. 154(b) by 90 days.

(21) Appl. No.: 13/385,560

(22) Filed: Feb. 27, 2012

(65) Prior Publication Data

US 2013/0220257 A1 Aug. 29, 2013

(51) Int. Cl.
*B01D 46/00* (2006.01)

(52) U.S. Cl.
USPC ......................... 95/273; 55/385.3; 123/198 E

(58) Field of Classification Search
USPC ................ 55/385.3, 490, 493, 495, 315, 476; 123/198 E; 180/68.3, 219
See application file for complete search history.

(56) References Cited

U.S. PATENT DOCUMENTS 4,479,676 A 10/1984 Hayes
5,307,771 A 5/1994 Stahel, II et al.
6,780,214 B2 8/2004 Leibold
7,753,980 B2 * 7/2010 Kobayashi et al. ............. 55/495
2002/0033010 A1 * 3/2002 Schorn ......................... 55/385.3
2003/0010558 A1 1/2003 Buell et al.
2005/0051375 A1 * 3/2005 Momosaki .................... 180/219
2010/0193276 A1 8/2010 Mueller
2011/0232983 A1 * 9/2011 Abe et al. ..................... 180/68.3

* cited by examiner

*Primary Examiner* — Duane Smith
*Assistant Examiner* — Minh-Chau Pham
(74) *Attorney, Agent, or Firm* — Patent Law Offices of Michael E. Woods; Michael E. Woods

(57) ABSTRACT

An air directing device for motorcycles with an inner air directing plenum and an engine air cleaner bottom housing. The inner air directing plenum nests into the air cleaner bottom housing half. The walls of the air cleaner housing include an aperture that aligns with the forward opening of the inner air directing plenum. The air cleaner housing bottom base plate includes an aperture that aligns with the rear portion of the inner air directing plenum and also aligns with the location of the rear cylinder of a twin cylinder motorcycle engine. An optional outer air directing plenum attaches to the top housing half of an engine air cleaner. The space created between the top housing half and the inside surface of the outer plenum allows an air flow when the motorcycle is in motion that helps cool the rear cylinder of a twin cylinder motorcycle engine.

5 Claims, 7 Drawing Sheets

AIR DIRECTING DEVICE FOR MOTORCYCLES

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of motorcycle accessories and more specifically to an air directing device for motorcycle engines. Motorcycles are two wheeled motorized vehicles that have become a standard means of transportation for people in many locations around the world. Many motorcycles have air cooled engines, rather than the standard water cooled engines found in typical four wheeled vehicles.

Some motorcycle engines, such as many models made by the Harley Davidson Motorcycle Company, include two cylinders where there is one forward facing cylinder that is closer to the front of the motorcycle and a second adjacent cylinder that is closer to the rear of the motorcycle. The cylinders tend to be situated in a V shaped pattern with an air cleaner assembly located near the upper portion of the V.

Due to the location of the two cylinders with respect to air flow as the motorcycle is in forward motion, the rear cylinder tends to be cooled less than the front cylinder creating an unwanted heat buildup in the rear cylinder. This heat buildup can be damaging to the engine and possibly cause the engine to overheat and even shut down completely. To solve this problem, it would be helpful to have an air directing means that helps bring cool air to the rear cylinder of a twin cylinder engine.

BRIEF SUMMARY OF THE INVENTION

The primary object of the invention is to provide an air directing device for a motorcycle that directs cool air to the rear cylinder of a two cylinder motorcycle engine.

Another object of the invention is to provide an air directing device for a motorcycle that is specifically tailored for Harley Davidson two cylinder motorcycles.

Another object of the invention is to provide an air directing device for a motorcycle that provides a channel within the air cleaner housing to direct cool air to the rear cylinder of a two cylinder engine.

A further object of the invention is to provide an air directing device for a motorcycle that provides an air scoop member mounted to the outside housing of an air cleaner to direct cool air to the rear cylinder of a two cylinder engine.

Yet another object of the invention is to provide an air directing device for a motorcycle that is easy to install.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed an air directing device for motorcycles comprising: an inner air directing plenum and an engine air cleaner bottom housing half, said air directing plenum having a top plate and attached side plates, said inner air directing plenum being horizontally disposed and nesting into the upper portion of said air cleaner bottom housing half, said air cleaner bottom housing including side walls and an attached base plate, said air cleaner side walls including a forwardly disposed aperture that aligns with the forward opening of said inner air directing plenum, said air cleaner base plate including an aperture that aligns with the exit portion of said inner air directing plenum and also aligns with the location of the rear cylinder of a twin cylinder motorcycle engine, and said air directing plenum top plate including a pair of apertures that allow standard air tubing to connect from said motorcycle engine to a standard motorcycle engine air cleaner.

Said air directing device for motorcycles also including an outer air directing plenum, said outer air directing plenum being horizontally disposed and having top and bottom side walls, a rear wall and an attached top plate, said outer air directing plenum having a forward facing aperture and a rear right angle aperture, said rear right angle aperture aligning with the location of the rear cylinder of a standard twin cylinder motorcycle engine, said outer air directing plenum attached to a standard air cleaner cover by one or more centrally located screws and said screws including a standoff portion that allow said outer air directing plenum top plate to remain a fixed distance from the top of said air cleaner cover, said fixed distance between the outer surface of said air cleaner housing and the inner surface of said air directing plenum top plate forming the airspace that allows cool air to travel from said forward facing aperture and out of said rear right angle aperture and onto said rear cylinder.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
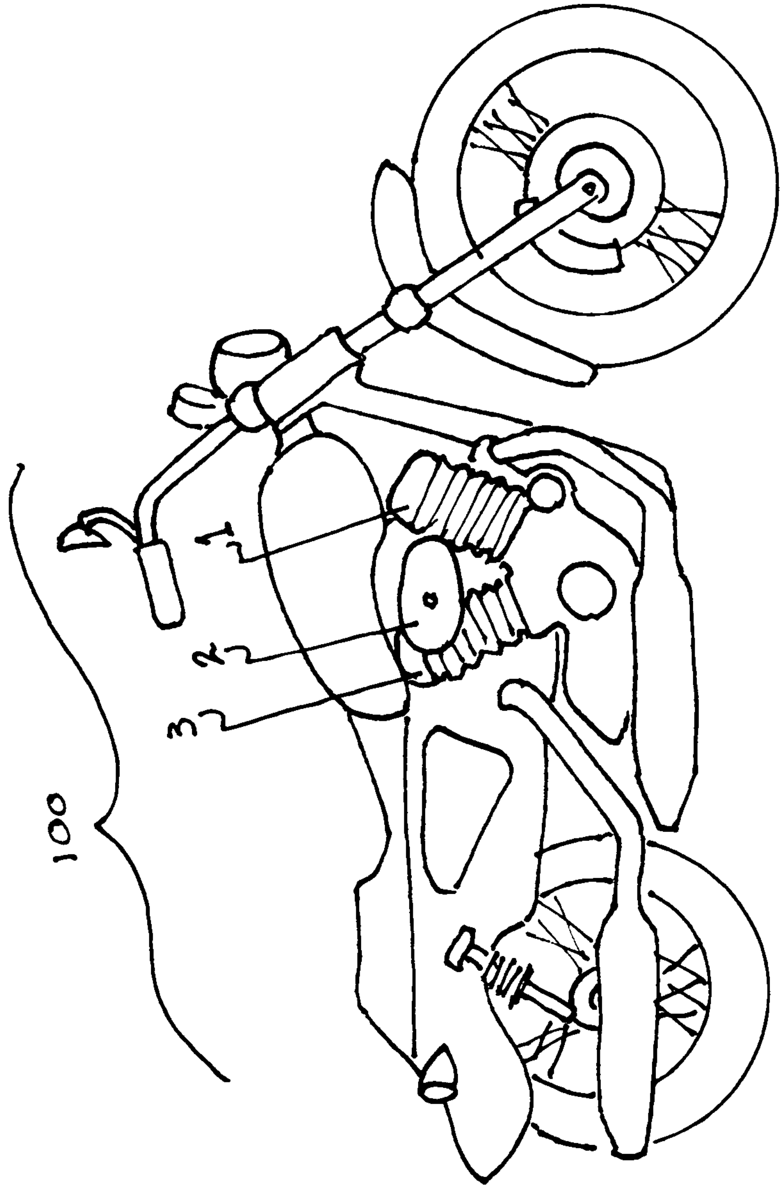
FIG. 1 is a side view of a Harley Davidson twin cylinder motorcycle.
Figure 2:
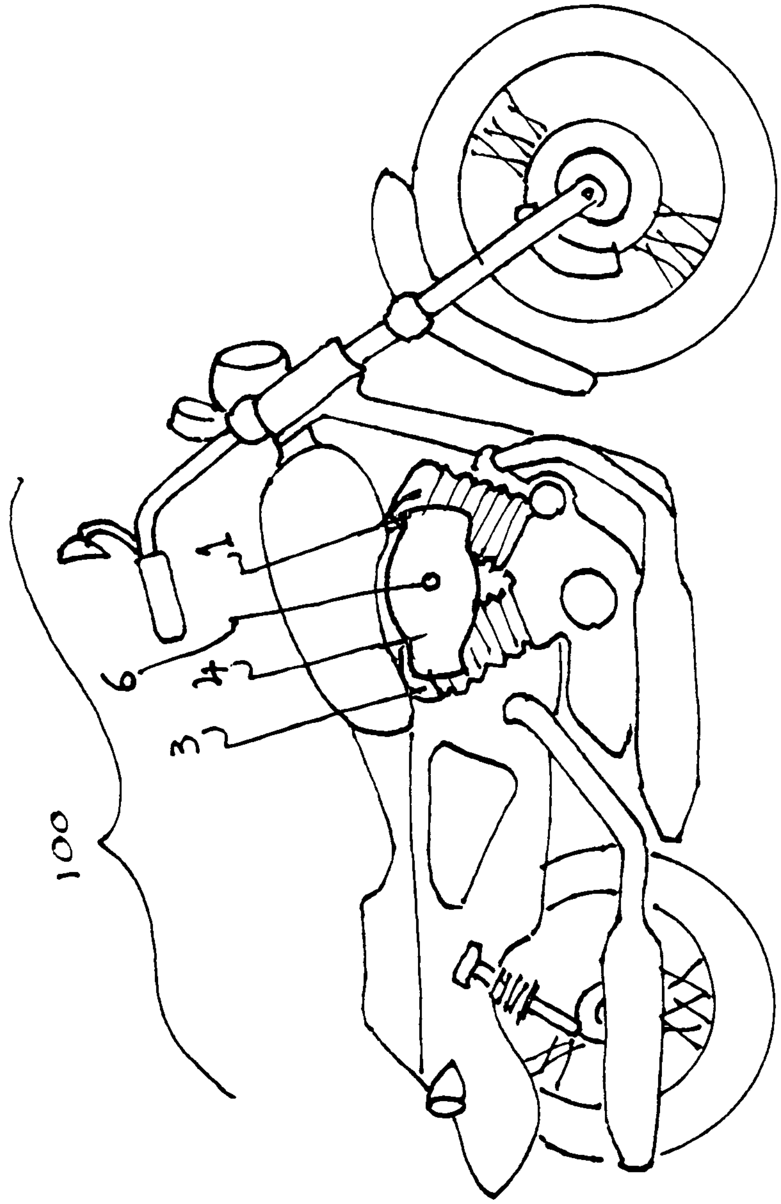
FIG. 2 is a side view of a Harley Davidson twin cylinder motorcycle with the air plenum of the present invention attached.

Referring now to FIG. 1 we see a side view of a twin engine Harley Davidson motorcycle 100. The forward cylinder 1 and the rear cylinder 3 form a V shape. The air cleaner assembly 2 is positioned between, and on the side of the two cylinders 1, 3. Figure two shows the same motorcycle 100 with an outer air directing plenum 4 mounted to the outside of the air cleaner assembly 2 by screw member 6.

Figure 3:
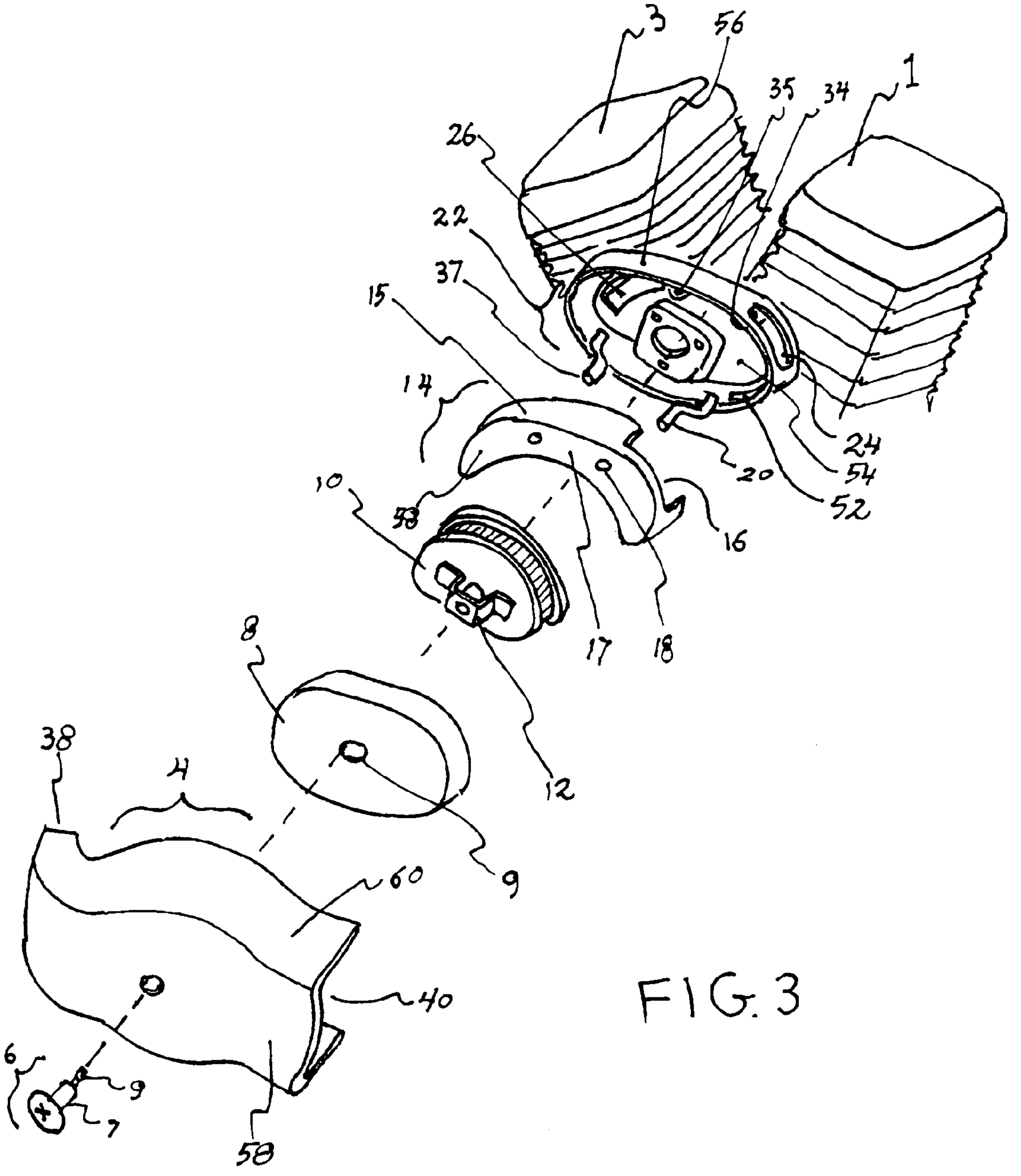
FIG. 3 is an exploded view of the air cleaner assembly and the inner and outer air plenums of the present invention.

FIG. 3 is an exploded view of the invention along with several standard motorcycle parts. The standard parts include engine cylinders 1, 3 and the top half housing 8 of the air cleaner assembly as well as air cleaner unit 10. The invention consists of a modified bottom housing 22, an inner air directing plenum member 14 and outer air directing plenum 4 and an attachment screw 6. The idea of the invention is to bring additional cool air to rear cylinder 3 while the motorcycle is in motion. The rear cylinder 3 typically becomes hotter than the front cylinder because of its location directly behind front cylinder 1. To help cool the rear cylinder 3, an additional inner plenum 14 is inserted into the modified bottom housing half 22 of the air filter assembly. The inner plenum 14 is comprised of a top plate 58 and attached side walls 15.

The difference between the standard bottom housing half and the present bottom housing half 22 is that an additional forward facing aperture 24 has been added to already existing aperture 52 in the side wall 56, and an additional rear aperture 26 has been added to the base plate 54 of the bottom housing half 22. Inner plenum 14 includes a forward facing aperture 16. Therefore, air is able to pass into the plenum 14 and out through aperture 26 of housing bottom half 22 so that it blows onto rear cylinder 3. To further cool rear cylinder 3, and outer air directing plenum 4 attaches to the top portion 8 of the air cleaner assembly. The outer air directing plenum 4 includes a top plate 58 and side walls 60. When fully assembled, there is a space between the inside of plenum plate 58 and the top of the housing half 8 as shown by the gap 62 in the side section view of the invention shown in FIG. 4. Custom screw 6 includes a shoulder portion 7 that acts as a separator to maintain the gap 62 described above. The screw 6 goes through the central aperture 9 in top half housing 8 and is threaded into a bracket 12 located on top of air cleaner filter 10. The outer air plenum 4 allows air to travel into front opening 40 and through gap 62, shown in FIG. 4, and then makes a right angle turn to exit out of rear, engine facing opening 38 which is directly in front of the rear cylinder 3 when installed onto top half housing 8. The air filter 10 attaches to bottom housing half 22 in a standard way.

Figure 4:
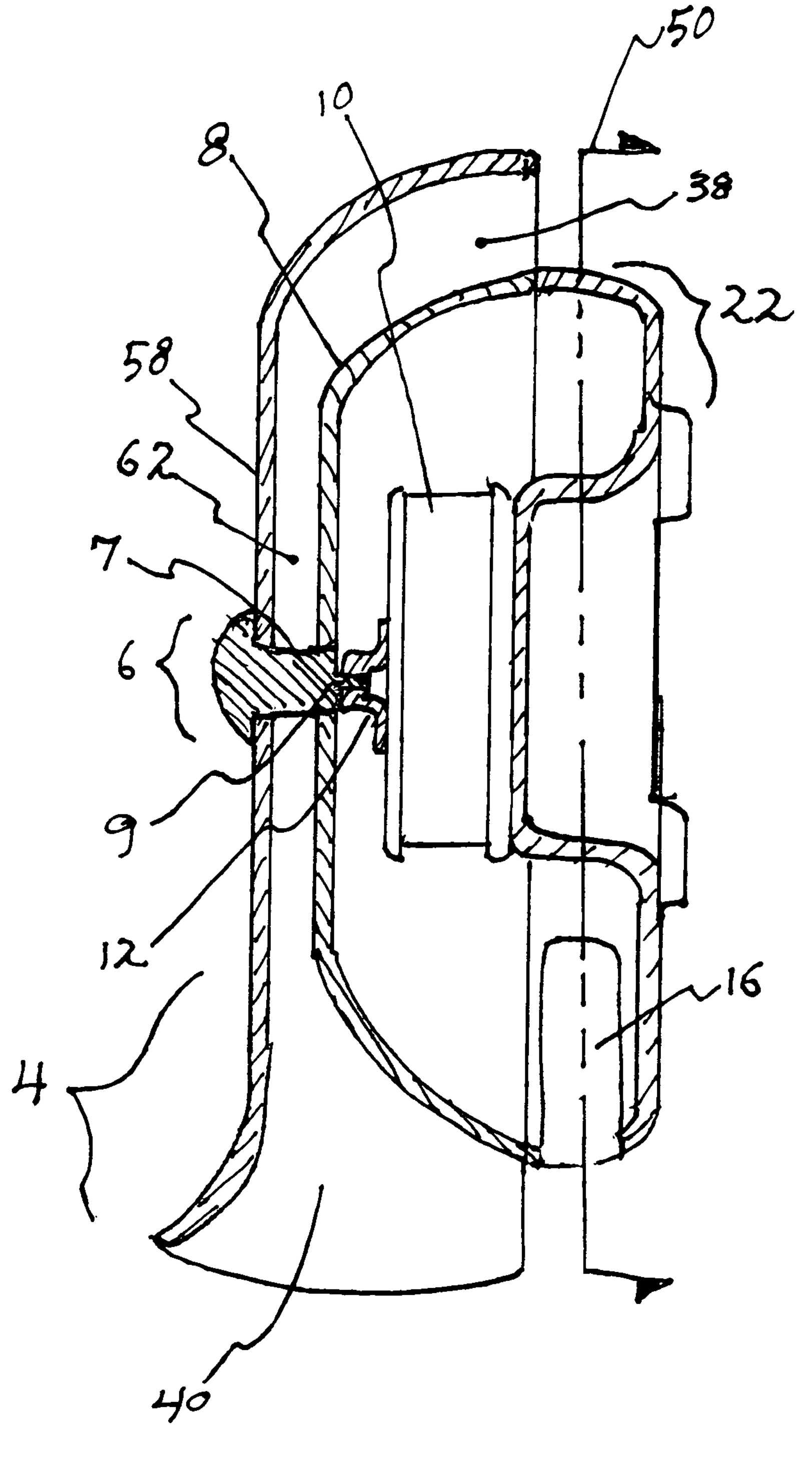
FIG. 4 is a horizontally disposed section view of the invention in place on an air cleaner.
Figure 5:
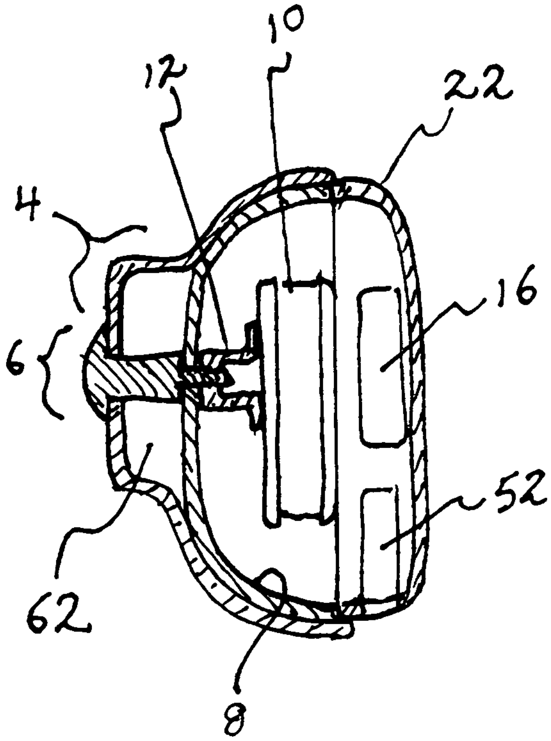
FIG. 5 is a front section view of the invention in place on an air cleaner.

FIG. 5 shows a front section view which bisects the invention. Air intake aperture 16 of the inner plenum 14 allows air to flow in when the motorcycle 100 is in forward motion. Air intake aperture 19 already exists in the standard air cleaner housing bottom 22 and acts to direct air into the air filter 10. Air plenum gap 62 allows air to flow into the outer plenum 4 and then out the exit area 38 as shown in FIG. 4 to cool the rear cylinder 3 of the motorcycle engine.

Figure 6:
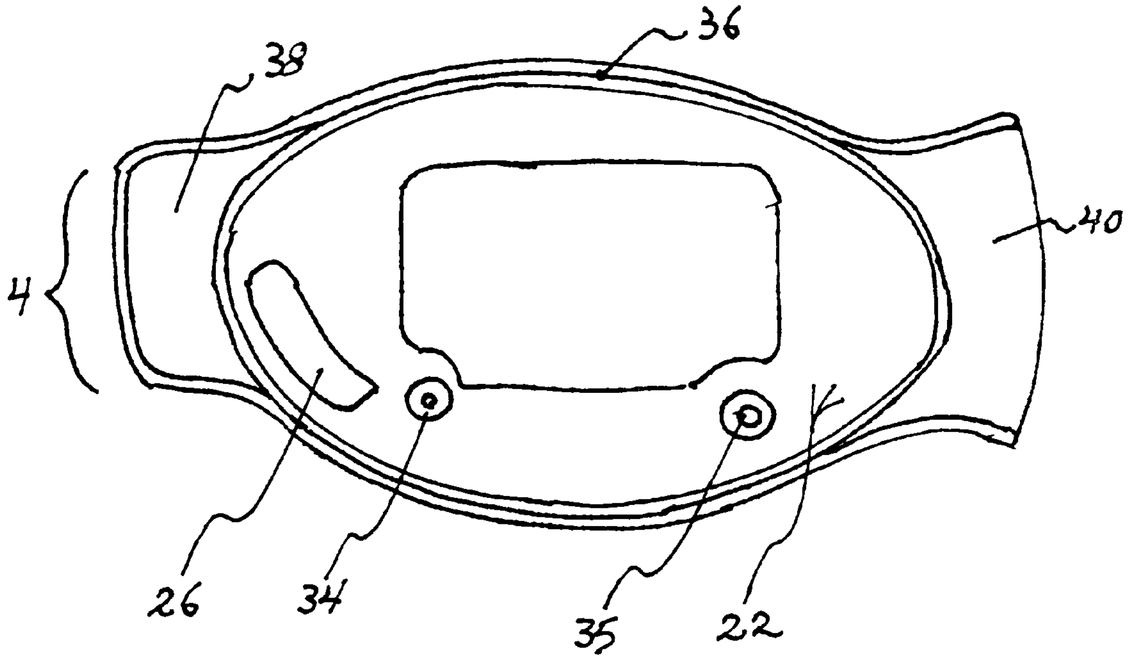
FIG. 6 is a rear view of the bottom air cleaner housing half and outer air plenum.

FIG. 6 shows a rear view of the air cleaner housing bottom half 22 nested into the outer air directing plenum 4. The side walls of the outer plenum 4 are in intimate contact 36 with the outer walls of the bottom half housing 22 thereby forcing all incoming air into air intake 40 and out engine facing exit port 38. The exit aperture 26 for the inner air directing plenum 14 can also be clearly seen. Standard air intake apertures 34, 35 are shown which direct air from the air cleaner 10 and associated standard tubes 20, 37 into the motorcycle engine.

Figure 7:
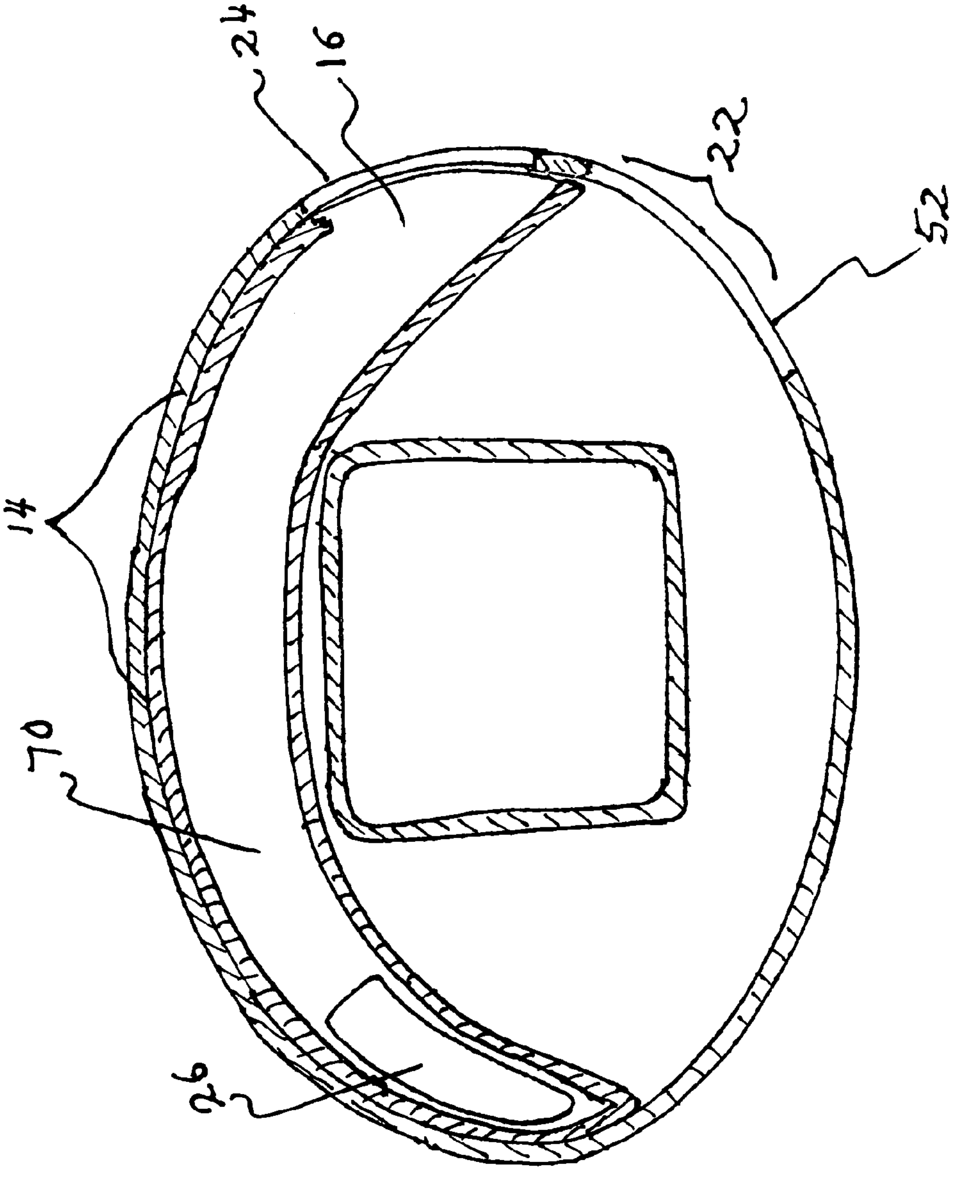
FIG. 7 is a section view of the inner air plenum and air cleaner housing bottom half member.

FIG. 7 shows a top section view as defined by section line 50 shown in FIG. 4. The perimeter of the inner plenum 14 can be clearly seen as it is nested into the air cleaner housing bottom half 22. The bottom 70 of inner plenum 14 is formed by the inner surface of the air cleaner bottom half housing 22. Exit aperture 26 of the bottom half housing 22 allows air to exit the plenum 14 and strike engine cylinder 3 for cooling purposes.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An air directing device for a motorcycle including an engine having a forward cylinder, a rear cylinder disposed rearwardly of and in line with the forward cylinder, and an air cleaner assembly for intake air for the engine disposed laterally of and overlying outside portions of both of the cylinders, comprising:

an engine air cleaner housing bottom half of the air cleaner assembly, said engine air cleaner housing bottom half including a sidewall extending away from a base plate, said sidewall defining a first forwardly facing aperture and an air intake aperture and said base plate defining a first rearward aperture overlying a first outside portion of the rear cylinder with said sidewall defining an air cleaner volume configured to receive an air cleaner unit;

an inner air directing plenum having a first top plate and first attached side walls, said inner air directing plenum being horizontally disposed and nesting into said air cleaner volume, with said inner air directing plenum including a second forwardly disposed aperture aligned with said first forwardly facing aperture when disposed within said air cleaner volume forming a first air communication channel extending from a first cooling intake at said first forwardly facing aperture, past said air cleaner unit, to said first rearward aperture at a first cooling exit; and an engine air cleaner housing top half, coupled to said an engine air cleaner housing bottom half enclosing said air cleaner unit;

wherein an air intake channel extends from said air intake aperture into said air cleaner unit and then into one or more air tubes coupled into the engine through said engine air cleaner housing bottom half; and wherein said first top plate includes one or more apertures adapted to allow the one or more air tubes to connect the engine to said engine air cleaner.

2. The air directing device of claim 1 further comprising:

an outer air directing plenum, coupled to and spaced away from said engine air cleaner housing top half forming a gap, including a second top plate having a second attached side walls, said second attached side walls defining a front opening and an engine facing opening positioned overlying a second outside portion of the rear cylinder wherein said outer air directing plenum forms a second air communication channel extending from a second cooling intake at said front opening aperture, past said air cleaner unit, to said engine facing opening at a second cooling exit.

3. The air directing device of claim 2 further comprising a screw having a shoulder portion, said screw coupling said outer air directing plenum to said engine air cleaner housing top half wherein said shoulder portion configured to maintain said gap.

4. A method for directing cooling air to a motorcycle including an engine having a forward cylinder, a rear cylinder disposed rearwardly of and in line with the forward cylinder, and an air cleaner assembly for intake air for the engine disposed laterally of and overlying outside portions of both of the cylinders, comprising:

a) defining a forwardly facing aperture in an engine air cleaner housing bottom half of the air cleaner assembly;

b) defining a first rearward aperture in said engine air cleaner housing bottom half of the air cleaner assembly, said first rearward aperture overlying a first outside portion of the rear cylinder;

c) forming a first air communication channel extending from a first cooling intake at said first forwardly facing aperture, past an air cleaner unit of the air cleaner assembly, to said first rearward aperture at a first cooling exit by inserting an inner air plenum into said engine air cleaner housing bottom half wherein said engine air cleaner housing bottom half includes a first aperture aligned with said first forwardly facing aperture and a second aperture aligned with said rearward aperture; and d) forming an air intake channel extending from an air intake aperture provided in said engine air cleaner housing bottom half to and through said air cleaner unit and then into one or more air tubes coupled into the engine through said engine air cleaner housing bottom half by said engine air cleaner housing bottom half with an engine air cleaner housing top half.

5. The method of claim 4 further comprising:

e) covering the air cleaner assembly with an outer air directing plenum, coupled to and spaced away from said engine air cleaner housing top half forming a gap, including a second top plate having a second attached side walls, said second attached side walls defining a front opening and an engine facing opening positioned overlying a second outside portion of the rear cylinder wherein said outer air directing plenum; and f) forming a second air communication channel extending from a second cooling intake at said front opening aperture, past said air cleaner assembly, to said engine facing opening at a second cooling exit.

* * * * *